June 3, 1924.
E. DAVIS
GLASS MANUFACTURE
Filed Feb. 16, 1923.
1,496,151
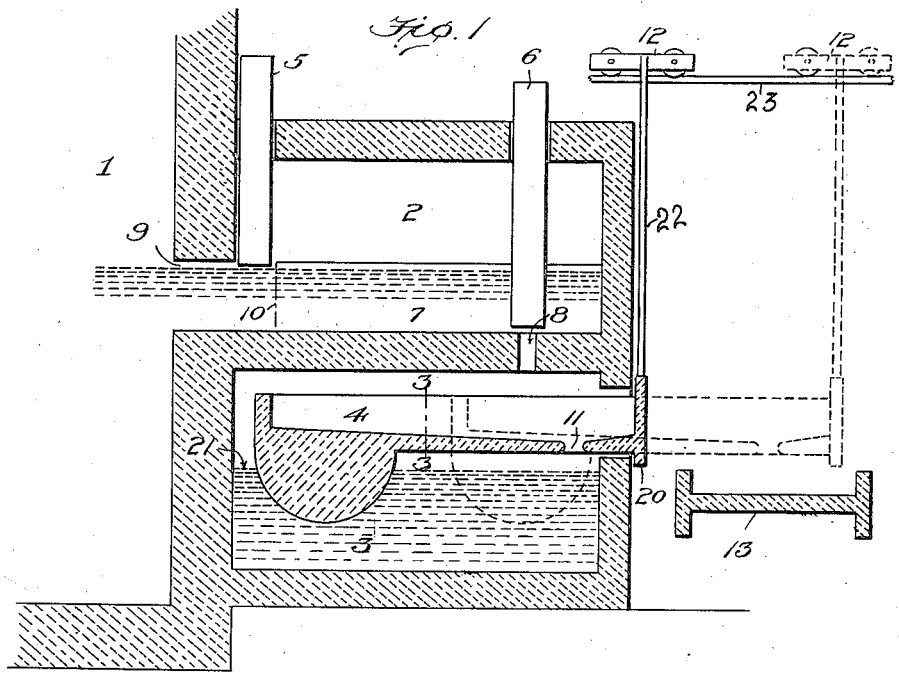
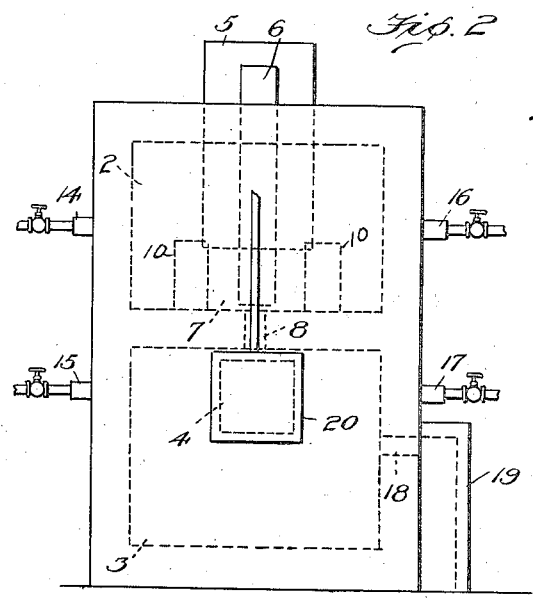
Inventor
Elmer Davis
By Adrian Sizer
his Attorney Patented June 3, 1924.

1,496,151

UNITED STATES PATENT OFFICE.

ELMER DAVIS, OF OKMULGEE, OKLAHOMA.

GLASS MANUFACTURE.

Application filed February 16, 1923. Serial No. 619,455.

*To all whom it may concern:*

Be it known that I, ELMER DAVIS, a citizen of the United States, residing at Okmulgee, in the county of Okmulgee and State of Oklahoma, have invented certain new and useful Improvements in Glass Manufacture, of which the following is a specification.

This invention pertains to the glass working art, and is directed to an apparatus by means of which molten glass may be transferred from the melting tank or furnace to a drawing pot or receptacle, without the interference of several objectional features now common in the art.

In the manipulation of molten glass and the development thereof into the finished product, it is essential that a uniform temperature be maintained throughout the batch of molten glass from which the finished article is drawn.

One of the objects of this invention is to dispense with the manual labor incident to the step of ladling as it is known in the art, and to overcome the difficulties encountered in ladling the molten glass from the melting tank to the drawing receptacle. In this step it is impossible to avoid a chilling of that portion of the glass which comes into immediate contact with the lower temperatured ladle, resulting in blisters and blemishes appearing therefrom in the finished product. Other advantages of my invention will appear as the description thereof proceeds.

In the drawings, showing the preferred embodiment of my invention:

Fig. 1, is a longitudinal vertical section, showing the front end of a melting tank with my improvement applied thereto.

Fig. 2, an end view, partly diagrammatic, and

Fig. 3, is a sectional view of one of the elements shown in Fig. 1, taken on the lines 3—3.

Like reference numerals refer to corresponding parts throughout the drawings.

In the drawings, 1, represents the main melting tank in which the glass is reduced to a fluid state; 2, is an extension built out from the main tank 1, and commonly called a "dog house," and into which the molten glass is adapted to flow from the main tank 1; 3, is a chamber positioned below the extension 2, also adapted to contain molten glass; 4, is a movable glass conveyor positioned within the chamber 3, and forms an important part of this invention; 6, is a valve member adapted to open and close the port 8, located in the dividing wall 7, between the chambers 2 and 3.

The front wall of the tank 1, has an opening 9, which communicates with the chamber 2. Located parallel with this front wall of the tank 1, and adapted for vertical movement is the shear cake 5 operating between the shoulders 10, to close the opening 9, between the main tank 1, and the chamber 2.

The movable glass conveyor 4 is adapted to be supported at its inner end by its own buoyancy in the glass 21, and at its outer end by the supporting upright 22, suspended from the trolley 12 operating on the tracks 23. The glass line level in the chamber 3, as at 21, is maintained by novel means that will hereinafter be more fully explained.

When the molten glass within this chamber 2, has acquired the proper temperature, and it is desired to transfer a portion thereof to the drawing pot 13, the movable conveyor 4 is positioned as shown in the dotted lines in Fig. 1. In this position the aperture 11, in the bottom wall of the conveyor 4 will be directly over the pot 13. With the conveyor so positioned, as the valve member 6 is raised to uncover the port 8, glass will flow therethrough into the conveyor 4. As the glass covers the bottom of the conveyor 4, it will seek an outlet at 11, and flow into the pot 13. When the requisite amount of molten glass is deposited in the pot 13, for drawing any given glass article therefrom, the conveyor 4 is again returned to its original position shown in Fig. 1, with the flange member 20, closing the aperture in the chamber 3, within which the conveyor 4 is adapted to operate. As the flange member 20, closes the aperture, the temperature within the chamber 3 will rise to the required point of increasing the temperature of the conveyor 4, and to cause any congealed glass adhering thereto to melt and run out at the aperture 11, and into the glass in the chamber 3. As the glass within the chamber 3 rises above the glass line at 21, there will be an overflow into the discharge outlet 19, and the overflow therefrom will be conducted to the kiln under the pot 13 (not shown). To maintain the required temperature within the chamber 3, the gas burners 15 and 17 are provided, and to maintain the necessary temperature within the chamber 2, the gas burners 14 and 16 are provided, comprising heating means well known in the art.

The pot 13, shown in cross section in Fig. 1, is of the usual form of reversible drawing pot provided with annular flanges for holding the glass therein. The drawing of the glass from the pot is a process well known in the art and forms no part of this invention, and no further description thereof is necessary. Any of the well known glass drawing machines can be used in conjunction with this invention.

It will be readily perceived that in the operation of my novel arrangement I avoid the serious difficulties encountered in the methods now in common use. In such prior methods it is impossible to avoid disturbing the molecules of the molten glass or stirring the glass after it is melted, and this agitation of the molten mass is detrimental to the finished product.

In the process of ladling it is enevitable that the wall of the melting tank must be provided with an opening, for the insertion of the ladle, through which colder air enters the tank and necessarily comes in contact with the surface of the glass being disturbed by the immersion of the ladle therein, and it is this agitation of the mass during the slight cooling which takes place through the contact of the cooler air therewith, that causes lines and blisters in the finished product.

It will be obvious to those skilled in the art, that my improved apparatus for transferring the molten glass from the melting tank to the drawing pot, by means of the movable carrier I provide for taking the glass from a melting tank that is maintained practically sealed from the atmosphere, and that the glass is drawn from a zone of molten glass at a substantial distance from the surface of the glass, thereby eliminating the commingling with the glass being worked, of the foreign substances and impurities always found floating on the surface of glass within a tank.

It will also be perceived that I provide novel means for maintaining the movable carrier at the required temperature by maintaining it partially immersed in a bath of highly temperatured molten glass, which automatically removes any chilled residue of glass remaining in the carrier after each operation.

To those skilled in the art, it will be apparent that the novel arrangement herein shown forms an important step in advance in the art of ladling.

The nature and scope of my invention having been indicated herein, and its preferred embodiment set forth in the drawings for the purpose of illustration, I desire to have it understood that I do not limit myself to the specific structure shown herein. Other modifications thereof may be made within the scope of the appended claims.

What I claim is:

1. In apparatus for the manufacture of glass, a tank having an extended end portion divided into upper and lower glass holding compartments, a glass discharge port located between said compartments, a glass conveying trough having one end buoyantly supported by the glass in the lower compartment and positioned to receive molten glass discharged through said port substantially as described.

2. In apparatus for manufacture of glass, a tank having an extended end portion divided into upper and lower compartments for containing molten glass, a closable port interposed between said compartments for the discharge of glass therethrough, a glass conveying trough normally positioned within the lower compartment having one end extended and supported by means outside of said compartment with its inner end supported by its own buoyancy in the molten glass, and positioned to receive molten glass discharged from said port.

3. In apparatus for the manufacture of glass, a tank having an extended end portion divided into upper and lower compartments containing molten glass; a glass drawing pot located adjacent to said lower compartment; a glass conveyor positioned within said lower compartment and partially supported by the molten glass therein adapted to receive molten glass from said upper compartment and to discharge the same into said glass drawing pot.

4. A glass working apparatus comprising a melting tank having an enclosed extended end portion formed with a bottom wall having a glass discharge port therein; a heating kiln positioned under said extended end portion and a horizontally movable glass conveyor normally positioned within said kiln adapted to receive molten glass from said discharge port.

5. In apparatus for the manufacture of glass, a tank for containing molten glass having an enclosed extended end portion formed with a bottom wall provided with a glass discharge port therein; a heating kiln positioned under said extended end portion; a refractory glass receiving trough suspended for reciprocal movement within said kiln and adapted to receive glass from said discharge port, and means for maintaining the temperature of said trough above the glass melting point.

6. A glass working apparatus comprising a melting tank having an enclosed extended end portion formed with a bottom wall having a glass discharge port therein; a heating kiln positioned under said extended end portion; a glass drawing pot located adjacent to said kiln; a glass conveying trough positioned normally within the lower compartment and adapted to receive glass from said discharge port and convey it to said drawing pot substantially as described.

7. A glass working apparatus comprising a melting tank having an extended end portion formed with a bottom wall having a closable glass discharge port therein, a heating kiln positioned under said extended end portion; a glass drawing pot adjacent to said kiln, a glass conveying trough normally positioned within said kiln provided with a discharge port at one end thereof, and means to move said trough to place its discharge port over the drawing pot, to discharge the glass therein.

In testimony whereof I have affixed my signature.

ELMER DAVIS.